United States Patent
Morgan et al.

[11] 3,868,081
[45] Feb. 25, 1975

[54] BRACKETS

[76] Inventors: David L. Morgan, 6, Church Row, Hampstead, London, N.W. 3; Peter Sampson, 20, Kingswood Rd., London, S.W. 19, both of England

[22] Filed: Feb. 23, 1973

[21] Appl. No.: 335,052

[30] Foreign Application Priority Data
Feb. 28, 1972 Great Britain...................... 9011/72

[52] U.S. Cl. ............... 248/245, 108/10.7, 248/221, 248/231
[51] Int. Cl.... A47b 47/00, A47b 3/06, A47g 29/02
[58] Field of Search .......... 248/221, 230, 231, 245; 182/187, 188; 211/107; 24/243 S; 108/152, 106, 107, 108

[56] References Cited
UNITED STATES PATENTS
| | | | |
|---|---|---|---|
| 773,188 | 10/1904 | Boast............................ | 248/230 X |
| 1,350,367 | 8/1920 | Giddings............................ | 211/107 |
| 1,609,147 | 11/1926 | White............................... | 248/231 |
| 3,244,392 | 4/1966 | Sheets................................ | 248/231 |
| 3,342,444 | 9/1967 | Nelson............................. | 248/44 X |
| 3,424,420 | 1/1969 | Seiderman...................... | 248/230 X |

FOREIGN PATENTS OR APPLICATIONS
767,757  7/1934  France............................. 248/230

Primary Examiner—J. Franklin Foss

[57] ABSTRACT

A bracket, more particularly for use in display equipment for supporting shelves or the like, which consists of an elongate arm having a clamping head at its one end and which can be releasably clamped on a substantially vertically disposed supporting member, for example a tube or rod having a circular cross-section.

9 Claims, 3 Drawing Figures

BRACKETS

BACKGROUND OF THE INVENTION

In erecting display equipment, such as paneling and shelving, difficulties are often encountered in securing conventional brackets, which include protruding bolts and nuts or similar clamping members, to supporting members for these brackets which members also join together the individual panels, due to the space at the place of mounting of the brackets being usually restricted. For the same reason the positional adjustment of these brackets is cumbersome and time consuming, and very often entails the use of special tools.

The present invention aims at providing a bracket which avoids the use of protruding parts and is simple in operation and yet efficient in its clamping action on the respective supporting member.

SUMMARY OF THE INVENTION

To this end, the present invention consists in a bracket comprising an elongate arm adapted to support a shelf or the like and a clamping head arranged at one end of said arm for mounting the bracket on a substantially upright cylindrical support, said clamping head including a part-cylindrical portion integral with said arm, a part-cylindrical leaf spring member attached at its one end to the free end of said integral part-cylindrical portion, a separate part-cylindrical member attached at its one end to the other end of said spring member and substantially corresponding in shape and dimensions to said integral portion, said separate member having at its other end a straight portion serving to co-operate with a portion of said arm adjacent said integral portion, and securing means serving releasably to connect said co-operating portions together, whereby to cause the head to surround the cylindrical support and to be clamped thereon.

Advantageously, said integral part-cylindrical portion and said separate part-cylindrical member each have a length substantially corresponding to a quarter (90°) of the circumference of the cylindrical support, said spring member having a length substantially corresponding to half (180°) of said circumference.

Preferably, said securing means is constituted by at least one screw which is screwable into tapped holes one in each said co-operating portions. Conveniently, said screw has a cylindrical head which at its end remote from the screwthread is provided with a knurled portion and a slot for receiving an operating tool, the other end of the screw head being contiguous with a portion of reduced diameter which is smaller than the diameter of the adjacent screwthread.

The said spring member may be attached to said integral portion and said separate member by means of riveting or welding.

In order to facilitate alignment of said co-operating portions and to strengthen the connection therebetween, at least one locating hole is provided in one or the other of said co-operating portions which is engageable by a peg in said other or said one co-operating portion.

BRIEF DESCRIPTION OF THE DRAWINGS

In order that the invention may be more readily understood, reference is made to the accompanying drawings which illustrate diagrammatically and by way of example one embodiment thereof, and in which.

DETAILED DESCRIPTION OF PREFERRED EMBODIMENT

Figures 1, 2, 3:
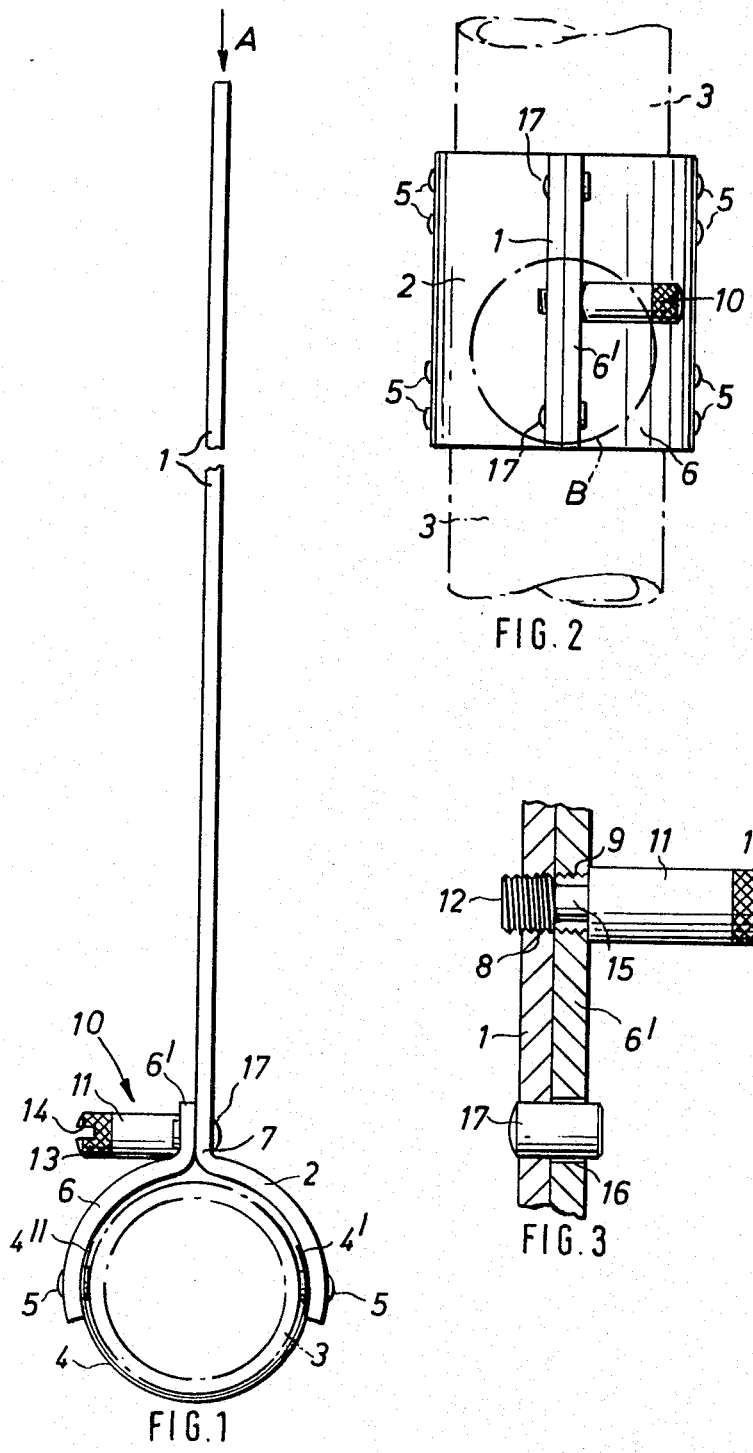
FIG. 1 is a plan view of the bracket in accordance with the invention.
FIG. 2 is an end view of the bracket in the direction of arrow A in FIG. 1.
FIG. 3 is an enlarged cut-away view of the detail B of FIG. 2.

Referring to the drawings, the bracket illustrated comprises a flat elongated arm portion 1 which at its one end is bent away from the plane of the arm portion to form a part-cylindrical portion 2 adapted to engage a correspondingly shaped portion of the surface of a vertically arranged support member 3 of circular cross-section, for example a tube. The part-cylindrical portion 2 is adapted to engage the tube over substantially a quarter (90°) of the tube circumference.

A strip 4 of spring steel, having a width corresponding to that of the arm portion 1 and the part-cylindrical portion 2 and bent to enclose the tube 3 over substantially half (180°) its circumference, is joined by rivets 5 at its one end 4' to the free end portion of the part-cylindrical portion 2 and at its other end 4" to one end of a separate part-cylindrical member 6 substantially corresponding in shape and dimensions to the part-cylindrical portion 2 integral with the arm 1. The integral part-cylindrical portion 2 together with the semi-cylindrical spring strip 4 and the separate part-cylindrical member 6 enclose in use the tubular support 3 over its entire periphery. The free end 6' of the separate part-cylindrical member 6 is bent outwardly so as to extend, in the mounted position of the bracket on the tube, parallel to and in alignment with the elongate arm portion 1 at the junccture 7 of the arm 1 and the integral part-cylindrical portion 2.

Tapped holes 8 and 9 are respectively provided in the arm portion 1 at the juncture 7 and in the bent end portion 6' of the separate part-cylindrical member 6 so as to be in register when the part-cylindrical elements 2, 4 and 6 tightly surround the periphery of the tube 3.

The pair of tapped holes 8 and 9 serves to receive a screw 10 having a cylindrical head 11 which at its end remote from the screwthread 12 is provided with a knurled portion 13, for facilitating manipulation of the screw 10 by hand, and a slot 14 for receiving an operating tool, for example the blade of a screwdriver. The other end of the screw head 11 is contiguous with a cylindrical portion 15 of reduced diameter which is smaller than the diameter of the screwthread 12. In the clamped condition of the bracket on the tube 3, the portion 15 is located within the tapped hole 9. This arrangement enables adjustment of the clamping action to compensate for any dimensional tolerances of the tube 3.

The outer surface of the curved portion of the integral part-cylindrical portion 2 and of the separate part-cylindrical member 6 adjacent the tapped holes 8 and 9 respectively, is cut away in the form of part-cylindrical recesses (not visible in the drawings) to accommodate part of the head 11 of the screw 10 when it is screwed-in either from the side of the member 6 (as shown) or from the opposite side.

In order to facilitate parallel alignment of the co-operating portions 6' and 1 and to strengthen the connection therebetween, two spaced apart locating holes 16 are provided in the portion 6' of the member 6, which are engageable by pegs 17 formed or provided in the arm portion 1 adjacent the juncture 7.

For mounting the bracket on the vertically disposed tubular support 3, the spring strip 4 with the separate part-cylindrical member 6 attached to it is unwound counter to the tensioning direction of the spring strip 4 so as to enable these two elements 4, 6 to encircle the tube 3 when the integral part-cylindrical portion 2 is brought into contact with the tube 3. Upon bringing the bent-out end 6' of the separate member 6 to the arm portion 1, the screw 10 held in the hole 9 in the end 6' is screwed into the hole 8 in the arm 1 to cause the spring 10 to be slightly tensioned around the tube 3 by pulling the bent-out end 6' towards the arm portion 1. When the bracket is secured tight around the tube 3 a comparatively small gap may be left between the facing surfaces of the separate member 6 and the arm portion 1 in order to allow for any wear on the clamping head and to compensate any dimensional tolerances on the tube 3. The clamping action of the bracket on the tubular support 3 is automatically increased upon loading of the bracket arm 1, for example by a shelf and any object supported thereon due to the increase in the tension of the spring strip 4 caused by the cantilever action of the arm 1.

Whilst in the embodiment described above the connection of the spring strip 4 to the integral portion 2 and to the separate member 6 is effected by means of riveting, it will be appreciated that the other permanent connection means, such as welding may be used instead. Furthermore, in place of the single, centrally disposed screw 10, two such screws arranged in spaced relationship may be used, in which case the pegs 17 may be dispensed with. In certain circumstances, for example where the load on the bracket is comparatively small, the screw 10 may be dispensed with and the parts 6' and 1 may be releasably connected together by a substantially rigid clip of U-shaped cross-section which slides over the parts 6' and 1 and the base of which is accommodated in an appropriate recess formed in the longitudinal edges of the parts 6' and 1.

What we claim is:

1. A bracket for supporting a shelf or the like from an upright cylindrical support, said bracket comprising an elongate arm upon which a shelf or the like is supported horizontally in use of the bracket and a clamping head arranged at one end of said arm for attaching the bracket to the said upright cylindrical support, wherein said clamping head comprises a part-cylindrical portion attached to said arm and adapted to lie against part of the circumference of the cylindrical support, a leaf spring member permanently having a natural curvature which is substantially the same as that of said part-cylindrical portion, means for permanently attaching one end of said leaf spring member to said part-cylindrical portion forming a substantially continuous internal cylindrical surface which lies against the surface of the cylindrical support in use of the bracket, a part-cylindrical member, means for permanently attaching the part-cylindrical member to the other end of said leaf spring member, said part-cylindrical member having a curvature substantially the same as that of said part-cylindrical portion, the natural resilience of said spring strip and the length of the latter being such that when said part-cylindrical portion lies against part of the circumference of the cylindrical support the spring strip brings the part-cylindrical member into juxtaposition with another part of the circumference of said support while the spring strip itself lies against an intermediate part of the circumference of said support so that the head surrounds said support, said part-cylindrical member having a straight portion which lies adjacent part of said arm when the leaf spring member embraces the support, and securing means for releasably connecting said straight portion and said adjacent part of the arm to clamp the head to the support.

2. A bracket as claimed in claim 1, wherein said integral part-cylindrical portion and said separate part-cylindrical member each have a length substantially corresponding to a quarter (90°) of the circumference of the cylindrical support, said spring member having a length substantially corresponding to half (180°) of said circumference.

3. A bracket as claimed in claim 1, wherein said securing means is constituted by at least one screw which is screwable into tapped holes one in each said co-operating portions.

4. A bracket as claimed in claim 3, wherein said screw has a cylindrical head which at its end remote from the screwthread is provided with a knurled portion and a slot for receiving an operating tool, the other end of the screw head being contiguous with a portion of reduced diameter which is smaller than the diameter of the adjacent screwthread.

5. A bracket as claimed in claim 1, wherein said spring member is attached to said integral portion and said separate part-cylindrical member by means of riveting.

6. A bracket as claimed in claim 1, wherein at least one locating hole is provided in one or the other of said co-operating portions which is engageable by a peg in said other or said one co-operating portion for aligning said co-operating portions and for strengthening the connection therebetween.

7. A bracket as claimed in claim 1 in which the width of the spring strip is greater than the diameter of the cylindrical support to which the bracket is attached.

8. A bracket as claimed in claim 1 wherein each of said means for permanently attaching comprises a plurality of rivets.

9. A bracket as claimed in claim 1 wherein said securing means comprises a screw in one of said arm or straight portion and a tapped hole in the other of said arm or straight portion, whereby said hole and screw are automatically in line when the bracket is about the support.

* * * * *